(No Model.) 2 Sheets—Sheet 1.
J. W. NORTON & F. H. ROUSE.
APPARATUS FOR REMOVING PARAFFINE FROM OIL TANKS.
No. 313,514. Patented Mar. 10, 1885.
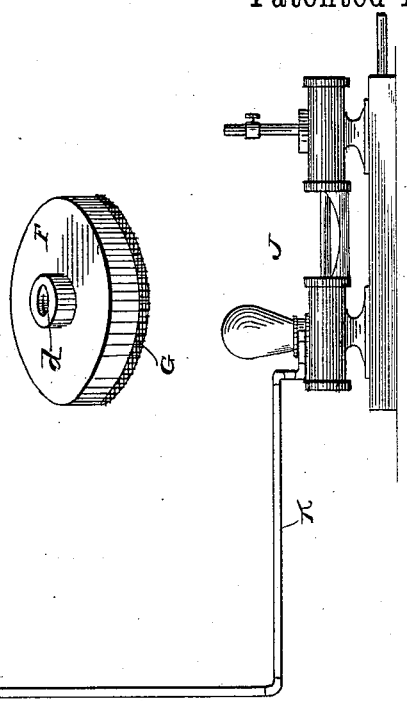
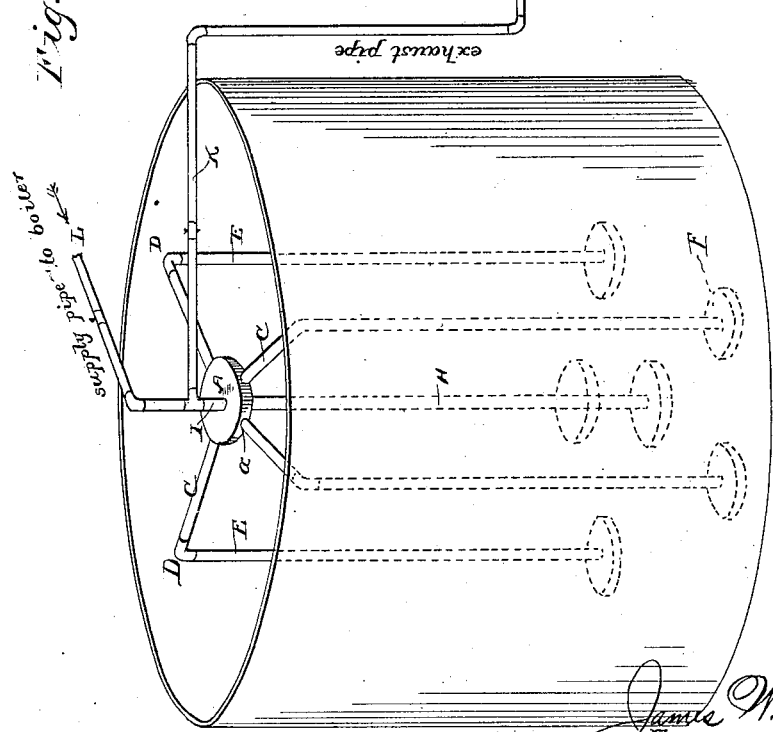
WITNESSES
W. H. Mortimer
E. G. Siggers
James W. Norton
Franklin H. Rouse
INVENTORS
by C. A. Snow & Co
Attorneys (No Model.) 2 Sheets—Sheet 2.
J. W. NORTON & F. H. ROUSE.
APPARATUS FOR REMOVING PARAFFINE FROM OIL TANKS.
No. 313,514. Patented Mar. 10, 1885.
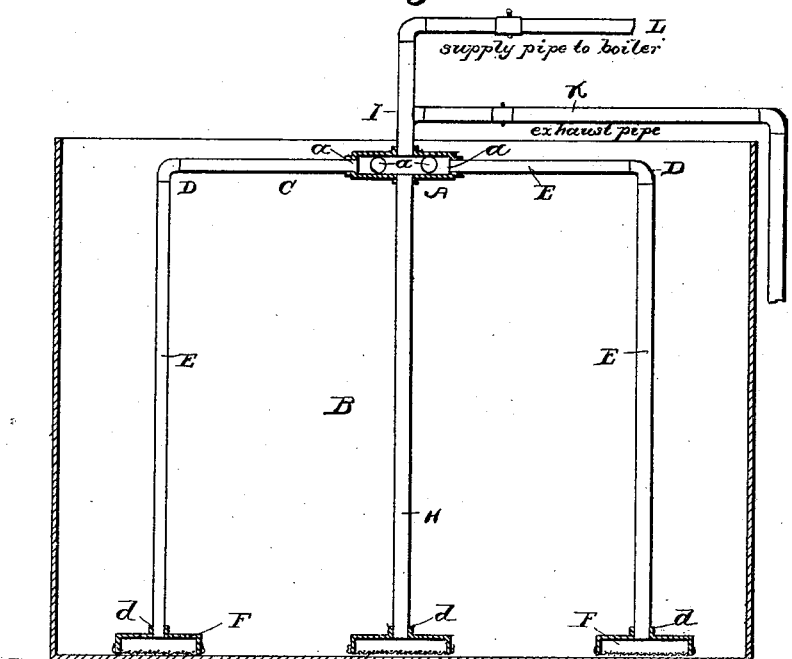
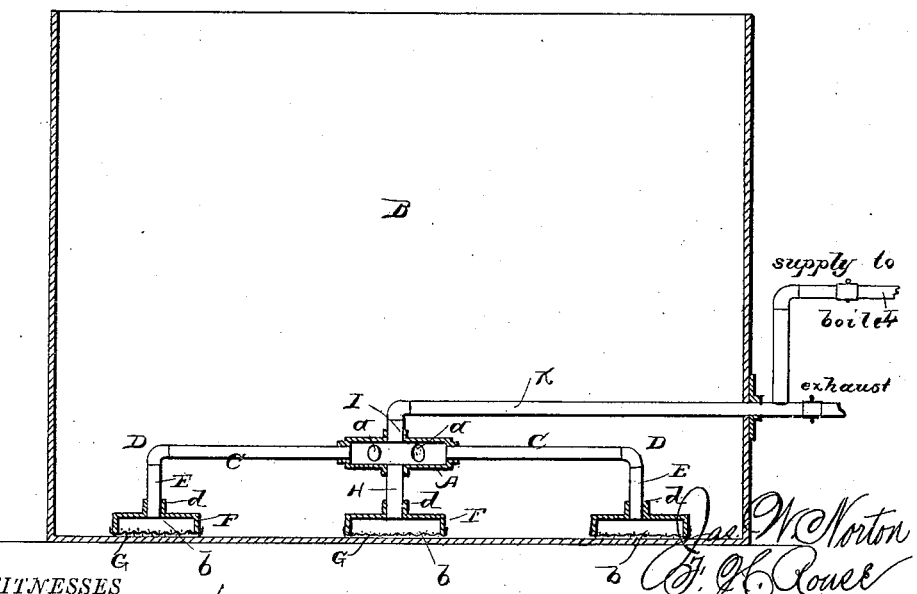
WITNESSES
INVENTORS
Attorneys

UNITED STATES PATENT OFFICE.

JAMES W. NORTON AND FRANKLIN H. ROUSE, OF KINZUA, PENNSYLVANIA, ASSIGNORS OF ONE-THIRD TO JACOB C. FULLER, OF SAME PLACE.

APPARATUS FOR REMOVING PARAFFINE FROM OIL-TANKS.

SPECIFICATION forming part of Letters Patent No. 313,514, dated March 10, 1885.

Application filed September 1, 1884. (No model.)

*To all whom it may concern:*

Be it known that we, JAMES W. NORTON and FRANKLIN H. ROUSE, citizens of the United States, residing at Kinzua, in the county of Warren and State of Pennsylvania, have invented a new and useful Improvement in Apparatus for Removing Paraffine, Sedimentary, or B. S. Oil from Oil-Tanks, of which the following is a specification, reference being had to the accompanying drawings.

This invention relates to an improved apparatus for removing paraffine, sedimentary, or B. S. oil from the bottom of oil-tanks.

In the great oil regions of this country, and especially those of Pennsylvania, to which we have particular reference, it has been the custom to store the oil received from the wells in large tanks preparatory to refining it for the various purposes known to the trade. While in its crude condition this oil contains many impurities and foreign matter, which, being heavier than the merchantable oil, settle near to the bottom, or cake thereto like tar. The heavier particles or sediments of the oil which descend to the bottom of the tank are very dense, and are known to the trade as "B. S. oil." Above the latter is located the paraffine-oil, which is somewhat heavier than the purer oil above it, and for that reason settles near the bottom. This foreign matter gradually accumulates until it encroaches on the space left for the merchantable oil, and for that reason it has been found necessary to have this sedimentary substance removed from the tank as soon as practicable. For this purpose various means have been resorted to without success, the usual course of procedure being to empty the tank of the merchantable oil and remove the sedimentary deposits from the bottom of the tank. This occasioned a great loss of time, since it took so long to remove and replace the oil, and besides it was very slow work to scrape the foreign matter from the bottom. To remedy these defects, we have devised an apparatus which will expedite the removal of these sedimentary deposits from under the merchantable oil, so as not to agitate or mix the oils together, this sedimentary or B. S. oil being afterward purified and returned back to the tank from which it came, or into another tank.

A further object of the invention is to provide means for cleansing oil-tanks when empty by the introduction thereto of steam and water; and a still further object of the invention is to provide means for heating the body of oil in the tank as found desirable.

With these and other objects in view the said invention consists in certain details of construction and combination of parts, as hereinafter set forth, and particularly pointed out in the claims.

In the accompanying drawings, Figure 1 is a perspective view of an oil-tank with our improved apparatus applied thereto, the pipes leading into the tank being shown in dotted lines. Fig. 2 is a vertical section thereof. Fig. 3 is a detail view of one of the disks. Fig. 4 is a perspective view of a tank, showing the apparatus applied thereto when the latter is empty.

Like letters of reference are used to indicate corresponding parts in the several figures.

Referring to the drawings, A designates a hollow drum placed upon the top and in the center of the oil-tank B, and provided with a series of openings, $a$, in its periphery, a series of horizontal radiating pipes, C C, connecting with said openings, and having their outer ends provided with elbow-joints D D, to which are attached a corresponding number of vertical pipes E E, the latter leading down and nearly to the bottom of the tank.

F designates the disks, constructed of wood or metal, and preferably rectangular in form, as seen in Fig. 3, the bottom side of the disk being open, as at $b$, and wire-cloth or perforated sheet metal G covering this opening and surrounding the disk. The upper side of the latter is provided with a threaded cap or nipple, $d$, to receive the lower ends of the pipe E. By this arrangement each of the vertical pipes E will be provided with one of the disks, or its equivalent, and since the pipes occupy different portions of the tank all portions of the bottom thereof will be reached when the apparatus is in operation. Besides the pipes E, which radiate from the drum, there is a vertical pipe, H, connected directly to the under side of the same, and extending downwardly to the bottom of the tank, and provided with the aforesaid disk F.

To the upper side of the drum A is attached a pipe, I, provided with a branch, K, which extends outward over the tank and is connected to a force-pump, J, of any suitable construction, and another branch, L, which receives a supply of steam from a boiler. The latter, however, we have not shown.

The operation of our invention will be readily understood from the foregoing description taken in connection with the annexed drawings.

The valve of the steam-pipe L is operated to allow the passage of steam through the pipe I direct from the boiler into the drum A, and thence outward through the several pipes E H. As the steam issues from the disks F at the lower ends of the said pipes it causes a lateral motion to be given to the body of the oil, so as to liquefy the sedimentary deposits. The cock or valve of the exhaust-pipe K of the pump is then opened and the valve of the steam-pipe closed, and this action causes the liquefied paraffine, sedimentary, or B. S. oil to be drawn upward into the vertical pipes E H and into the pipe I and through the pipe K, which leads to a refining-still, (not shown,) where the sedimentary deposits are acted upon to be purified, so that it may be returned back to the tank from which it came or to another tank.

In Fig. 4 we have shown the means employed to clean empty tanks. In this arrangement we dispense with the vertical pipes E H, and place the drum with its radiating pipes C C in the bottom of the tank, the disks F or their equivalents connecting by threaded caps or nipples with the ends of the said pipes C. The steam-supply pipe L and exhaust-pipe J are attached to the main pipe L, which is connected by a threaded cap or nipple to the top of the drum and runs horizontally through the side of the tank, as shown; but it may run upward to the top thereof. In the construction of new tanks we preferably allow for this arrangement. When the pipe I runs parallel with the drum and its radiating pipes, we avoid lifting the oil over the top of the tank, and gravitate it to any place required.

In adapting our invention for heating oil, we dispose the drum in such a manner that one disk will be in the center of the tank and the rest any required distance around it. We employ the arrangement of vertical pipes shown in Figs. 1 and 2, and force steam or hot air through the pipes and disks into the oil or paraffine, thereby liquefying it so as to render its removal easy and certain. In this manner our device may be used for various purposes; but the special object which we claim for the apparatus is for the purpose of removing paraffine, sedimentary, or B. S. oil from tanks or other receptacles used for storing oil, and from under the good and merchantable oil, without agitating or mixing the good oil with the sedimentary or B. S. oil, the removal of these deposits giving more space or tankage for the merchantable oil.

By employing a series of pipes which reach the several portions of the oil-tank, we have found that the draft from the several pipes at the same time distributes, lifts, or draws small quantities of the sedimentary deposits which have been liquefied, from different parts of the tank at the same time, and thus equalizes the pressure of the oil above to obviate the friction which would follow the employment of a single pipe, and, furthermore, to increase and distribute the supply to the main or exhaust pipe. Moreover, there will be less agitation created under the disk of the several pipes than there would be under the disk of one pipe. The disk is also a special feature of our invention, since it gives a lateral motion without agitation to the oil, instead of a downward motion, which is produced by the use of a single pipe when used without the disk or its equivalent. The disks afford greater distribution of the steam or water to give a lateral motion to the oil and furnish greater supplies to the main or exhaust pipe with less friction than would be obtained through a single pipe of the same size.

The disks may be constructed hollow when used for heating oil, and may be of any shape or size, and for this reason we do not wish to be limited to any particular form, since such may be varied at will without materially affecting the operation or avoiding the present invention.

Our invention provides a new heating apparatus for oil in tanks by forcing steam through the vertical pipes and out into the oil under the disks at one and the same time, and condensing the steam under the disks, destroying its pressure, and eliminating its heat through the disk into the oil above the disk as well as from the hot water that is made by the condensed steam, thereby avoiding the boiling and stirring up of the sedimentary oil and prevent mixing it with the oil above, as would be done by a single pipe without the disk. After a few inches of the bottom has been heated the steam may be shut off, and the quantity heated may be drawn off by the exhaust-pipe.

Our apparatus equalizes the heat throughout the bottom of the tank, so that the heavier particles or sediments or paraffine which are in solution above will gravitate to the bottom, where it can be removed in the manner set forth, leaving a lighter and purer oil for refining into illuminating-oil.

Our apparatus may also be used for heating the oil without forcing the steam into it by employing hollow disks connected together by pipes, the steam passing from one disk to another and out through the tank, condensed, and may be returned to the boiler and be used over again.

The advantages of our invention are numerous. By means of the same we are enabled to expedite the removal of the sedimentary oil or B. S. oil, which cakes like tar to the bottom of the tank, this withdrawal being effected while the tank is filled with oil.

The mechanism employed is simple in construction and efficient in operation.

Any ordinary force-pump may be used, and any suitable boiler may be employed in providing the hot air, steam, or water to effect the action, the exhaust and supply pipes being operated by a suitable valve or cock.

Having described our invention we claim—

1. The herein-described method of removing paraffine, sedimentary, or B. S. oil from the bottom of oil-tanks, consisting, first, in forcing steam, hot air, or hot water through pipes to the bottom of the tank and beneath the oil in the same to liquefy the sedimentary deposits, and finally causing the withdrawal of the liquefied solution up through the said pipes and out from the tank to a suitable receptacle without removing the oil, as set forth.

2. The herein-described method of removing paraffine, sedimentary, or B. S. oil from the bottom of oil-tanks without emptying the latter of their contents, consisting, first, in heating the body of oil, causing the heavier particles to gravitate to the bottom of the tank and also giving a lateral motion to the oil so as to liquefy the sedimentary deposits, and finally withdrawing the liquefied solution from under the oil and out to a suitable receptacle, as set forth.

3. The herein-described process or method of removing paraffine, sedimentary, or B. S. oil from the bottom of oil-tanks without emptying the latter of their contents, consisting in forcing steam, hot air, hot water, or its equivalent through pipes to the bottom of the tank, so as to heat the oil in its passage through the pipes and give a lateral motion to the body of oil as it issues from the pipes, thereby causing the sedimentary deposits to be liquefied, and then withdrawing the liquefied solution from under the oil and out through the said pipes to a suitable receptacle, as set forth.

4. The herein-described apparatus, comprising the drum having a series of pipes radiating therefrom, disks or their equivalents on the ends of the pipes, and means for supplying the drum with hot air, hot water, or steam, as set forth.

5. The herein-described apparatus for the purposes mentioned, consisting of a drum provided with a series of radiating pipes, said drum being arranged to be supplied with steam or its equivalent, as described, from a suitable supply source, and having an exhaust-pipe connecting with a suitable exhaust power, such as a force-pump, for withdrawing the liquefied deposits through the said exhaust-pipe, arranged and operating as set forth.

6. The herein-described apparatus for the purposes mentioned, consisting of a drum provided with a series of pipes disposed within the oil-tank, having disks or their equivalents at their lower ends, said drum communicating with a boiler to receive a supply of steam, hot air, or hot water, and a force-pump connected by a pipe with the drum and operated to exhaust the supply and cause the removal of the liquefied sedimentary deposits, as set forth.

7. The herein-described apparatus, consisting of a drum provided with a series of radiating pipes which have disks or their equivalents at their lower ends, said drum being arranged to be supplied with steam, hot air, or hot water from a suitable source, and having a main exhaust-pipe connecting with a force-pump or other exhausting apparatus, as set forth.

In testimony that we claim the foregoing as our own we have hereto affixed our signatures in presence of two witnesses.

JAMES W. NORTON.
FRANKLIN H. ROUSE.

Witnesses:
JACOB C. FULLER,
CHAS. DINSMOOR.